Aug. 16, 1955     A. J. VARTIAINEN     2,715,366
APPARATUS FOR DERIVING POWER FROM
THE WAVES OF A BODY OF WATER

Filed Sept. 4, 1951     4 Sheets-Sheet 4

Inventor:
Aarne Johannes Vartiainen
By

United States Patent Office 2,715,366
Patented Aug. 16, 1955

2,715,366

APPARATUS FOR DERIVING POWER FROM THE WAVES OF A BODY OF WATER

Aarne Johannes Vartiainen, Helsinki, Finland

Application September 4, 1951, Serial No. 245,042

9 Claims. (Cl. 103—68)

The great wave masses of the seas contain immense amounts of energy, which ought to be used to the benefit of mankind. Many efforts have already been made to realize the utilization of the energy of the waves and swells but hitherto with poor results.

The object of the present invention is a method and power-plant for utilization of the wave energy of the sea by taking the energy of the waves to the power plant as motive power with the aid of floats or tanks, arranged so, that the tanks support the power plant and at the same time give the driving movement to pumps, from which the motive power is further delivered to one or more turbines and from these to electric generators and other devices of the power plant.

It is advantageous if the total carrying capacity of the tanks is f. e. twice as great as the total weight of the power plant to ensure the floating of the plant even if a remarkable part of the tanks were in the down going phase of the waves and thus moving downward, the main part of the tanks at the same time getting from the waves a movement upward, each tank being attached to a pump piston and to shock absorbing and guiding devices for the tank.

The accompanying drawings illustrate by way of example an appliance constructed according to the invention.

Figure 1:
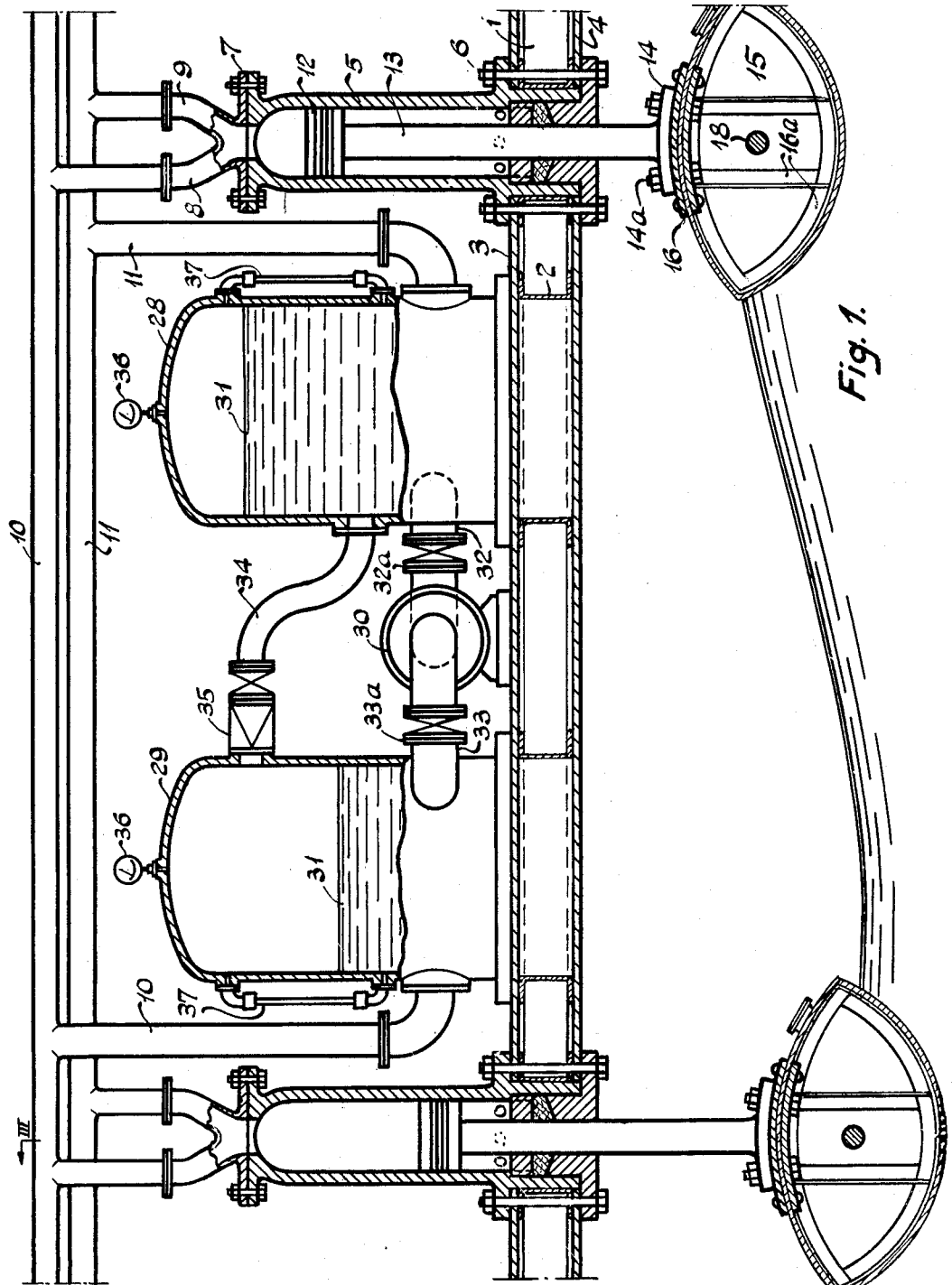
Fig. 1 illustrates schematically a transversal section of the powerplant (I—I, Fig. 2), the shock absorbing devices omitted.
Figure 2:
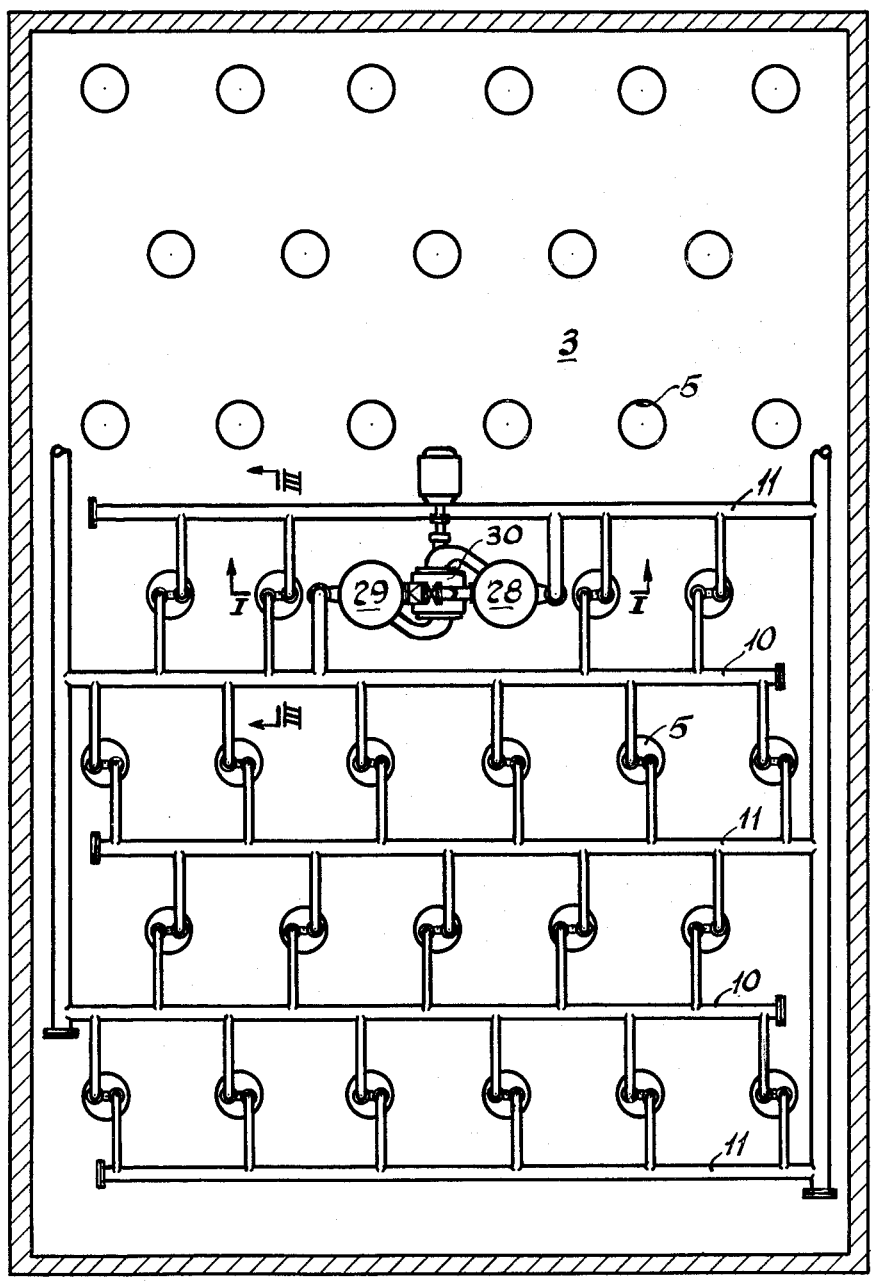
Fig. 2 is a plan view of the plant showing a part of the pipe lines and pumps.
Figure 3:
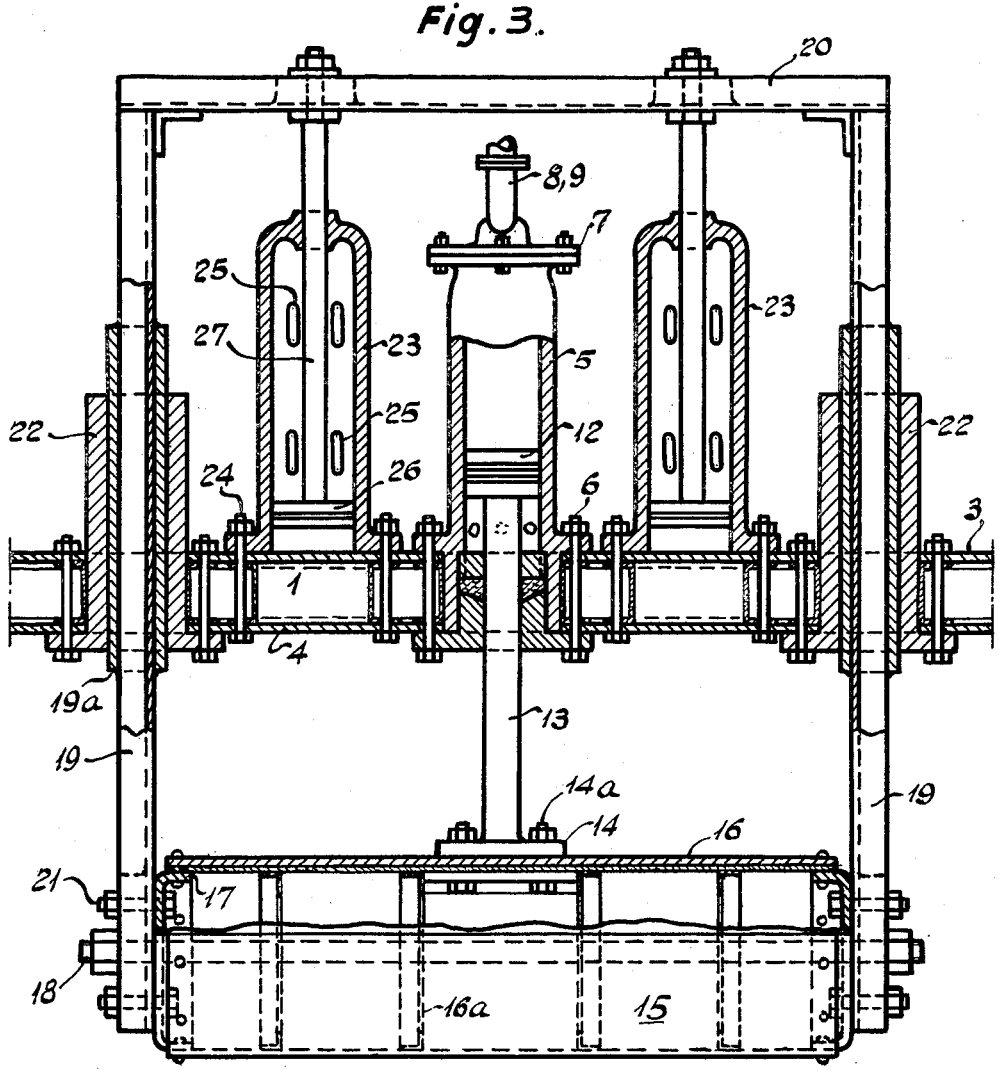
Fig. 3 is a sectional elevation of a tank and shock absorbing device.

The body of the power plant consists of a ferry- or bridge-formed plane or mounting 1, constructed of profile irons, steel, and plate parts. The profile irons, I- or U-beams 2 and the needed pipes are joined together e. g. by welding. The upper surface of the body consists of a sturdy deckplate 3 fastened to the beams. On the lower side of the beams 2 is fastened a bottom plate 4.

The pump cylinder 5 is made of one or more parts and fastened to the carriage 1 with screws 6 and reaches to the lower side of the carriage. On the upper end of the cylinder is attached a cover 7 with suction and pressure valves 8, 9 and pipes 10, 11. The piston 12 of the pump is made in known manner and equipped with piston rings. The piston rod 13 can be equipped with a crosshead and/or with a stuffing box. On the lower end of the piston rod 13 is a flange 14 for fastening of the same with screws 14a to a hollow float or tank 15, which with the aid of the waves gives the working movement to the piston.

The tank 15, driving the pump or pumps, is made of steel plate and is of cylindrical or of some other form. The upwards turned side of the tank is reinforced with a steel plate or a profile iron 16. The reinforcing support or supports 16a can also be arranged inside the tank and the endplates of same reinforced with a screw or screws 18. The piston rod 13 is from its flange 14 fastened to the tank with the aid of screws 14a.

The tank 15 is further equipped with one or more guiding and shock absorbing devices, consisting chiefly of a frame and the shock absorbing cylinders. The frame comprises vertical guiding rods 19 and a horizontal connecting beam 20. The frame is made of profile irons and the lower ends of the guiding rods 19 are fastened to the mantle or to the end plates 17 of the tank with screws 21. The guiding rods 19 of the frame are led through guiding bearings 22, fastened to the carriage 1—4, and for this purpose the rods are equipped with guiding bushes or plates 19a.

There are in this case two pieces of shock absorbing cylinders 23, fastened to the carriage 1—4 with screws 24. The cylinders 23 are equipped with air circulating ports 23, either free or connected to each other in known manner by pipes and regulating valves. The pistons 26 and piston rods 27 of the shock absorbers are made in known manner and the piston rods connected to the beam 20 of the frame, through which the absorbing of the shocks is directed to the tank 15. By arranging the airports 25 at suitable distances from the cylinder heads closed air spaces in the cylinders are forming air cushions limiting the extreme movements of the piston 12.

The number of the tanks and pumps is depending on the capacity of the projected power plant.

The main machinery of the power plant comprises the high and low pressure liquid cylinders 28, 29 arranged on the carriage 1—4 and a turbine 30, one of more of said turbines can be arranged in the same power plant. One or more electric generators with all necessary auxiliary machines and devices belong further to the plant. The liquid containers 28, 29 are connected to each other with a direct lead 34 fitted with a pressure reducing valve 35. The containers are further equipped with pressure gauges 36 and with gauge glasses 37 for the niveau of the liquid.

From the pump cylinders 5—7 are pressure pipes 11 connected to a high pressure-liquid container 28 and the suction or low pressure pipes 10 to a low pressure liquid containers 29. Said pipes 10 and 11 are equipped with known shut-off-, regulating- and safety-valves.

The turbine 30 or turbines are made in known manner and arranged on the carrier 1—4. The driving liquid for the turbines is e. g. oil or some other suitable liquid 31. The inlet port 32 of the turbine is connected to the high pressure container 28 or to the high pressure piping 11. The inlet port 32 is equipped with a shut-off valve 32a. The outlet pipe 33 from the turbine is connected to the low pressure container 29 or piping 10. The outlet pipe is equipped with a shut-off valve 33a.

The generators and auxiliary machines of the power plant are of known construction. The plant is also equipped with air compressors and containers. The lubricating devices are of known type, working chiefly on the centralized lubrication principle.

The invention is not limited to the details of construction and arrangement herein shown and described, and any changes or modifications may be made therein within the scope of the subjoined claims. The carriage of the plant can be equipped with watertight walls or containers so great, that the plant remains floating even if the supporting tanks are removed e. g. for repairs.

The power plant will be equipped with anchoring devices for fixing the same on its working place. The plant can also be equipped with propelling and steering devices so, that the same can be moved without the aid of tugboats. The plant can further be equipped with devices keeping the same in a desired direction in relation to the direction of the wind and the waves.

If desired several power plants can be coupled near each other to work on a common electric line.

Another example of construction comprises a carriage arranged on floats or boats so, that a wide channel or channels are formed for the tanks driving the pumps or so, that the tanks 15 are arranged on both sides of the vessel operating as the body of the plant.

Figure 4:
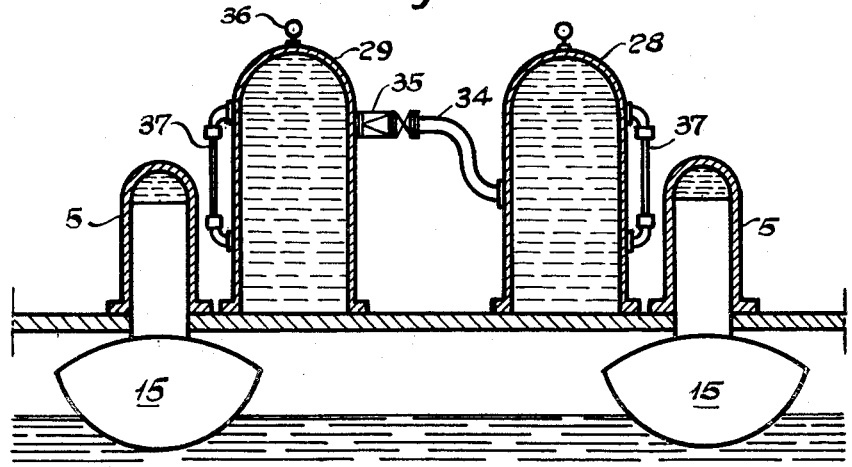
Fig. 4 is a schematic transversal section of the power plant with the pressure containers filled with some liquid, e. g. with oil.
Figure 5:
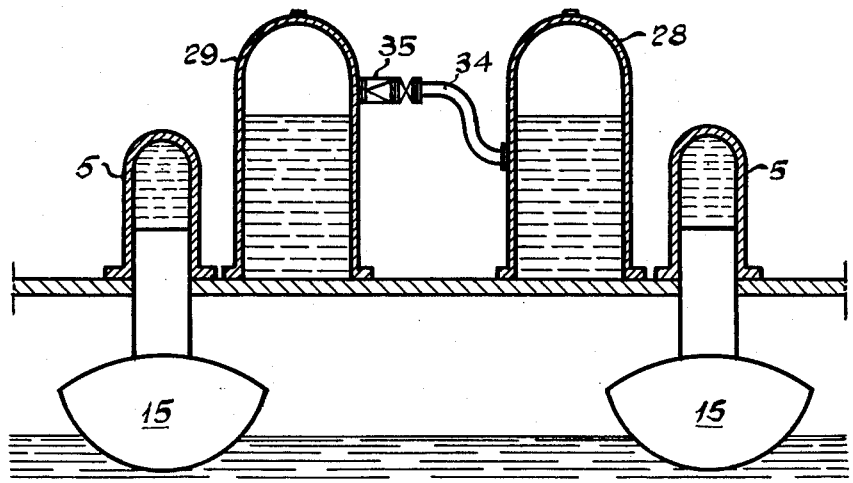
Fig. 5 is the same plant ready to work, the pressure containers partly filled with compressed air so, that a part of the oil is pressed from the containers to the pump cylinders and the power plant is raised to a desired working height.

The plant is brought in the working order so, that the liquid used, e. g. oil, is pumped to the low pressure container 29 until the suction and pressure pipes and also the high pressure liquid container 28 are filled (Fig. 4). Hereafter compressed air of e. g. 10 at. is led first to the high pressure container 28 and then to the low pressure container, until the niveau in the gauge glasses 37 shows the desired height, when a part of the oil from the containers is pressed through the low pressure pipes to the pump cylinders 15 so, that the power plant rises to a fixed height (Fig. 5).

By discharging the oil or other fluid under pressure from the container 28 to the turbine 30, the turbine is started and at the same time the generator and other devices start to operate. When the waves of the sea are operating the oil pumps 15, the oil is continuously running from the low pressure container to the pumps and from these to the high pressure container 29.

The regular working of the plant is attended to with the aid of corresponding valve and controlling devices, of which as many as possible are automatically working. When the turbines are not in operation the surplus high pressure oil is led from the container 28 directly through the pipe 34 and the pressure reducing valve 35 to the low pressure container 29. The pressure reducing valve can be substituted by a safety valve if the plant is arranged so, that in the suction pipes of the pumps exists an underpressure.

Having now described my invention, what I claim is:

1. Apparatus for deriving power from the waves of a body of water, comprising, in combination, a rigid platform; a plurality of cylinders mounted on said platform and extending upwardly therefrom; a plurality of pistons mounted in said cylinders; a plurality of piston rods respectively connected to said pistons and extending through said platform to the underside thereof; a plurality of floats respectively connected to said piston rods and supporting said platform above the body of water so that said platform and said cylinders tend to move by gravity downwardly along said pistons; and conduit means communicating with said cylinders for supplying a fluid thereto so that said pistons will drive the fluid from the cylinders to produce a source of power.

2. Apparatus for deriving power from the waves of a body of water, comprising, in combination, a rigid platform; a plurality of cylinders mounted on said platform and extending upwardly therefrom; a plurality of pistons mounted in said cylinders; a plurality of piston rods respectively connected to said pistons and extending through said platform to the underside thereof; a plurality of floats respectively connected to said piston rods and supporting said platform above the body of water so that said platform and said cylinders tend to move by gravity downwardly along said pistons; conduit means communicating with said cylinders for supplying a fluid thereto so that said pistons will drive the fluid from the cylinders to produce a source of power; and shock absorbing means operatively connected to said floats for damping the movement thereof.

3. Apparatus for deriving power from the waves of a body of water, comprising, in combination, a rigid platform; a plurality of cylinders mounted on said platform and extending upwardly therefrom; a plurality of pistons mounted in said cylinders; a plurality of piston rods respectively connected to said pistons and extending through said platform to the underside thereof; a plurality of floats respectively connected to said piston rods and supporting said platform above the body of water so that said platform and said cylinders tend to move by gravity downwardly along said pistons; conduit means communicating with said cylinders for supplying a fluid thereto so that said pistons will drive the fluid from the cylinders to produce a source of power; and shock absorbing means operatively connected to said floats for damping the movement thereof, said shock absorbing means comprising a frame connected to each float and extending to the top side of said platform, at least one additional piston connected to said frame for movement therewith, and an apertured cylinder mounted on said platform and guiding said additional piston for sliding movement therein.

4. In an apparatus for deriving power from the waves of a body of water, in combination, a platform; a cylinder mounted on said platform and extending upwardly therefrom; a source of fluid mounted on said platform; first conduit means leading from said source of fluid to said cylinder; first valve means located in said first conduit means for preventing fluid from flowing back through the latter to said source of fluid; second conduit means leading from said cylinder back to said source of fluid; second valve means mounted in said second conduit means for preventing fluid from flowing back through the latter to said cylinder; a piston mounted in said cylinder; a piston rod connected to said piston and extending through said platform to the underside thereof; and a float connected to said piston and being located beneath said platform to support the latter through said piston above the body of water, so that said platform and cylinder tend to move downwardly along said piston by gravity, and to cause said piston to be reciprocated in said cylinder by motion of the waves of the body of water, so that during its downward stroke said piston draws fluid into said cylinder from said source of fluid through said first conduit means and so that during its upward stroke said piston moves fluid from said cylinder through said second conduit means back to said source of fluid, whereby the fluid is circulated through said first conduit means, cylinder, second conduit means, and source of fluid to provide a source of power.

5. In an apparatus for deriving power from the waves of a body of water, in combination, a rigid platform; a cylinder mounted on said platform and extending upwardly therefrom; a source of fluid mounted on said platform; first conduit means leading from said source of fluid to said cylinder; first valve means located in said first conduit means adjacent to said cylinder for preventing fluid from flowing back through the latter to said source of fluid; second conduit means leading from said cylinder back to said source of fluid; second valve means mounted in said second conduit means adjacent to said cylinder for preventing fluid from flowing back through the latter to said cylinder; a piston mounted in said cylinder; a piston rod connected to said piston and extending through said platform to the underside thereof; and a float connected to said piston and being located beneath said platform to support the latter through said piston above the body of water, so that said platform and cylinder tend to move downwardly along said piston by gravity, and to cause said piston to be reciprocated in said cylinder by motion of the waves of the body of water, so that during its downward stroke said piston draws fluid into said cylinder from said source of fluid through said first conduit means and so that during its upward stroke said piston moves fluid from said cylinder through said second conduit means back to said source of fluid, whereby the fluid is circulated through said first conduit means, cylinder, second conduit means, and source of fluid to provide a source of power.

6. In an apparatus for deriving power from the waves of a body of water, in combination, a rigid platform; a cylinder mounted on said platform and extending upwardly therefrom; a high pressure tank mounted on said platform and adapted to contain a fluid under a high pressure; a low pressure tank communicating with said high pressure tank, also being mounted on said platform, and being adapted to contain a fluid at a low pressure substantially lower than said high pressure of said high pressure tank; low pressure conduit means leading from said low pressure tank to said cylinder; first valve means mounted in said low pressure conduit means to prevent fluid from flowing back through the latter to said low pressure tank; high pressure conduit means leading from said cylinder to said high pressure tank; second valve means mounted in said high pressure conduit means for preventing fluid from flowing back through the latter to said cylinder; a piston mounted in said cylinder for reciprocating movement therein; a piston rod connected to said piston and extending through said platform to the underside thereof; and a float connected to said piston rod and being located beneath said platform to support the latter above a body of water, so that said platform and cylinder as well as said tanks and conduit means tend to move downwardly along said piston by gravity, and to cause the motion of the waves of the body of water to reciprocate said piston in said cylinder for drawing fluid from said low pressure tank through said low pressure conduit means into said cylinder upon downward movement of said piston and for forcing fluid from said cylinder through said high pressure conduit means to said high pressure tank upon upward movement of said piston in said cylinder, whereby fluid continually flows from said high pressure tank to said low pressure tank to provide a source of power.

7. In an apparatus for deriving power from the waves of a body of water, in combination, a rigid platform; a cylinder mounted on said platform and extending upwardly therefrom; a high pressure tank mounted on said platform and adapted to contain a fluid under a high pressure; a low pressure tank communicating with said high pressure tank, also being mounted on said platform, and being adapted to contain a fluid at a low pressure substantially lower than said high pressure of said high pressure tank; low pressure conduit means leading from said low pressure tank to said cylinder; first valve means mounted in said low pressure conduit means adjacent to said cylinder to prevent fluid from flowing back through the latter to said low pressure tank; high pressure conduit means leading from said cylinder to said high pressure tank; second valve means mounted in said high pressure conduit means adjacent to said cylinder for preventing fluid from flowing back through the latter to said cylinder; a piston mounted in said cylinder for reciprocating movement therein; a piston rod connected to said piston and extending through said platform to the underside thereof; a float connected to said piston rod and being located beneath said platform to support the latter above a body of water, so that said platform and cylinder as well as said tanks and conduit means tend to move downwardly along said piston by gravity, and to cause the motion of the waves of the body of water to reciprocate said piston in said cylinder for drawing fluid from said low pressure tank through said low pressure conduit means into said cylinder upon downward movement of said piston and for forcing fluid from said cylinder through said high pressure conduit means to said high pressure tank upon upward movement of said piston in said cylinder, whereby fluid continually flows from said high pressure tank to said low pressure tank to provide a source of power; and shock absorbing means operatively connected to said float for damping the movement thereof.

8. Apparatus for deriving power from waves of a body of water, comprising, in combination, a rigid platform located over the body of water; a plurality of cylinders mounted on said platform and extending upwardly therefrom; a high pressure tank mounted on said platform and adapted to contain a fluid under a high pressure; a low pressure tank communicating with said high pressure tank, also being mounted on said platform, and being adapted to contain a fluid at a low pressure substantially lower than said high pressure of said high pressure tank; low pressure conduit means leading from said low pressure tank to said plurality of cylinders, respectively; a plurality of first valve means mounted in said low pressure conduit means respectively adjacent to said plurality of cylinders for preventing fluid from flowing back through said low pressure conduit means to said low pressure tank; high pressure conduit means respectively leading from said plurality of cylinders to said high pressure tank; a plurality of second valve means mounted in said high pressure conduit means respectively adjacent said cylinders for preventing fluid from flowing back through said high pressure conduit means to said cylinders; a plurality of pistons respectively mounted in said cylinders for reciprocating movement therein; a plurality of piston rods respectively connected to said pistons and extending through said platform to the underside thereof; and a plurality of floats respectively fixed to said piston rods and being located beneath said platform to support the same over the body of water, so that said platform and all elements carried thereby tend to move downwardly along said pistons by gravity, and to cause the motion of the waves to reciprocate said pistons in said cylinders so that fluid is drawn from said low pressure tank through said low pressure conduit means into said cylinders upon downward movement of said pistons and so that fluid is forced from said cylinders through said high pressure conduit means to said high pressure tank upon upward movement of said pistons, whereby fluid continually flows from said high pressure tank to said low pressure tank to provide a source of power.

9. Apparatus for deriving power from waves of a body of water, comprising, in combination, a rigid platform located over the body of water; a plurality of cylinders mounted on said platform and extending upwardly therefrom; a high pressure tank mounted on said platform and adapted to contain a fluid under a high pressure; a low pressure tank communicating with said high pressure tank, also being mounted on said platform, and being adapted to contain a fluid at a low pressure substantially lower than said high pressure of said high pressure tank; low pressure conduit means leading from said low pressure tank to said plurality of cylinders, respectively; a plurality of first valve means mounted in said low pressure conduit means respectively adjacent to said plurality of cylinders for preventing fluid from flowing back through said low pressure conduit means to said low pressure tank; high pressure conduit means respectively leading from said plurality of cylinders to said high pressure tank; a plurality of second valve means mounted in said high pressure conduit means respectively adjacent said cylinders for preventing fluid from flowing back through said high pressure conduit means to said cylinders; a plurality of pistons respectively mounted in said cylinders for reciprocating movement therein; a plurality of piston rods respectively connected to said pistons and extending through said platform to the underside thereof; a plurality of floats respectively fixed to said piston rods and being located beneath said platform to support the same over the body of water, so that said platform and all elements carried thereby tend to move downwardly along said pistons by gravity, and to cause the motion of the waves to reciprocate said pistons in said cylinders so that fluid is drawn from said low pressure tank through said low pressure conduit means into said cylinders upon downward movement of said pistons and so that fluid is forced from said cylinders through said high pressure conduit means to said high pressure tank upon upward movement of said pistons, whereby fluid continually flows from said high pressure tank to said low pressure tank to provide a source of power; and a plurality of shock absorbing means respectively connected to said floats for damping the movement thereof.

References Cited in the file of this patent

UNITED STATES PATENTS

| | | |
|---|---|---|
| 639,735 | Johnson | Dec. 26, 1899 |
| 671,592 | Hamilton et al. | Apr. 9, 1901 |
| 738,996 | Hagen | Sept. 15, 1903 |
| 816,934 | Newell | Apr. 3, 1906 |
| 886,104 | Williams | Apr. 28, 1908 |
| 1,019,027 | Denny | Mar. 5, 1912 |
| 1,102,121 | Anderson | June 30, 1914 |
| 1,665,140 | Master | Apr. 3, 1928 |